(12) United States Patent
Lin et al.

(10) Patent No.: US 10,792,974 B2
(45) Date of Patent: Oct. 6, 2020

(54) AIR REGISTER KNOB ASSEMBLY

(71) Applicant: Ford Global Technologies, LLC, Dearborn, MI (US)

(72) Inventors: Ryan Lin, Nanjing (CN); Evan Tian, Nanjing (CN); Gerald Yao, Nanjing (CN); Michael Neumann, Gisborne (AU)

(73) Assignee: Ford Global Technologies LLC, Dearborn, MI (US)

( * ) Notice: Subject to any disclaimer, the term of this patent is extended or adjusted under 35 U.S.C. 154(b) by 468 days.

(21) Appl. No.: 15/649,303

(22) Filed: Jul. 13, 2017

(65) Prior Publication Data

US 2018/0022180 A1   Jan. 25, 2018

(30) Foreign Application Priority Data

Jul. 20, 2016  (CN) .......................... 2016 1 0575749

(51) Int. Cl.
*B60H 1/00* (2006.01)
*B60H 1/34* (2006.01)

(52) U.S. Cl.
CPC ......... *B60H 1/0065* (2013.01); *B60H 1/3421* (2013.01)

(58) Field of Classification Search
CPC .............................. B60H 1/0065; B60H 1/3421
USPC ........................................................ 454/155
See application file for complete search history.

(56) References Cited

U.S. PATENT DOCUMENTS

| | | | | |
|---|---|---|---|---|
| 4,665,804 A | * | 5/1987 | Miyasaka | B60H 1/3428 454/315 |
| 5,056,420 A | * | 10/1991 | Komori | B60H 1/3421 454/155 |
| 5,364,303 A | * | 11/1994 | Terry | B60H 1/345 454/155 |
| 6,932,695 B1 | | 8/2005 | Zielinski et al. | |
| 9,073,407 B2 | * | 7/2015 | Kober | B60H 1/3414 |
| 9,162,551 B2 | * | 10/2015 | Yamamoto | B60H 1/3428 |
| 9,555,685 B2 | * | 1/2017 | Mercey | B60H 1/3421 |
| 9,764,622 B2 | * | 9/2017 | Noichl | B60H 1/3421 |
| 2001/0031619 A1 | * | 10/2001 | Yabuya | B60H 1/3421 454/155 |
| 2002/0178744 A1 | * | 12/2002 | Tanabe | B60H 1/3421 62/407 |
| 2005/0097704 A1 | * | 5/2005 | Song | B60H 1/3414 16/110.1 |
| 2006/0014485 A1 | | 1/2006 | Sousa et al. | |
| 2009/0286462 A1 | * | 11/2009 | Goto | B60H 1/3428 454/155 |
| 2013/0005233 A1 | | 1/2013 | Park | |
| 2013/0078900 A1 | * | 3/2013 | Zalan | B60H 1/3421 454/152 |
| 2013/0267158 A1 | | 10/2013 | Noichl et al. | |

(Continued)

FOREIGN PATENT DOCUMENTS

| JP | H10250357 A | | 9/1998 |
|---|---|---|---|
| JP | 2015017385 A | * | 1/2015 |
| WO | 2015084100 A1 | | 6/2015 |

*Primary Examiner* — Edelmira Bosques
*Assistant Examiner* — Frances F. Hamilton
(74) *Attorney, Agent, or Firm* — David Coppiellie; Kolitch Romano LLP (57) ABSTRACT

An air register knob assembly comprises a vane having a first side and a second side opposite the first side; a knob having a main body. The main body is slidably connected to only the first side of the vane.

17 Claims, 7 Drawing Sheets

(56) References Cited

U.S. PATENT DOCUMENTS

| | | | | |
|---|---|---|---|---|
| 2015/0065031 A1* | 3/2015 | Shibata | ................ | B60H 1/3421 |
| | | | | 454/322 |
| 2016/0009163 A1* | 1/2016 | Terai | .................... | B60H 1/3421 |
| | | | | 454/155 |

* cited by examiner

AIR REGISTER KNOB ASSEMBLY

RELATED APPLICATION

This application claims the benefit of Chinese Patent Application No CN 201610575749.8, filed Jul. 20, 2016, the entire contents thereof being incorporated herein by reference.

FIELD

The application relates generally to an air register knob assembly.

BACKGROUND

Modern vehicles typically include air register devices and adjusting devices to the air register to keep the interior atmosphere pleasant. Various air register adjusting devices are available.

For instance, US Patent Application No. US20060014485A1 discloses a control knob disposed on a vane in an air vent of a vehicle that encloses a vane in the air register. Such design is commonly used to adjust the air register vanes. However, such knob may not provide a good appearance and a desired strength at the same time.

SUMMARY

According to one aspect of the present disclosure, an air register knob assembly is provided. The air register knob assembly may comprise a vane having a first side and a second side opposite the first side; a knob having a main body, whereinthe main body may be slidably connected to only the first side of the vane.

In one embodiment, the vane may include an outer edge that is entirely uncovered.

In another embodiment, the knob may include an operation portion extending from the main body and beyond the outer edge of the vane, and wherein the operation portion and the main body may be both spaced apart from the outer edge.

In another embodiment, the main body of the knob may include a connector and the first side of the vane may include a mating member slidably connected to the connector.

In another embodiment, the connector may include a main body connector extending from a surface of the main body towards the vane, and the mating member may include a groove that engages the main body connector.

In another embodiment, at least one of the knob and the vane may include a stop.

In another embodiment, the main body connector may include a first protrusion that extends from the surface of the main body towards the vane at an angle, and the groove may be defined by a second protrusion that extends from the first side of the vane and a surface of the first side of the vane, wherein the second protrusion may extend towards the outer edge of the vane or an inner edge of the vane opposite the outer edge.

In another embodiment, the main body connector may include a base, an upper slider and a lower slider, wherein the upper slider and the lower slider may extend towards the outer edge of the vane and an inner edge opposite the outer edge of the vane, respectively, and wherein the groove may include an upper groove and a lower groove to receive the upper slider and the lower slider, respectively.

In another embodiment, the main body connector and the groove may extend along a lengthwise direction of the vane.

In another embodiment, wherein the knob may include an accessory connector and the accessory connector may be slidably connected to the vane.

In another embodiment, the accessory connector may be disposed on an edge of the knob opposite to the operation portion and the accessory connector may be slidably connected to at least a portion of an inner edge of the vane.

In another embodiment, wherein the inner edge may have a thinner region and a standard region and the accessory connector may be at least partially surrounding the thinner region.

In another embodiment, wherein at least one of the knob and the vane may include a flexible rubbing portion.

In another embodiment, wherein the flexible rubbing portion may be a rubber grommet received in a peripheral wall on the knob and wherein deformation of the rubber grommet due to a force from at least a portion of the vane may generate a predetermined friction force.

In another embodiment, wherein the knob may have a main body connector disposed on a surface of the knob, and the vane may have a second protrusion extending from the first side of vane, wherein the second protrusion may extend along a lengthwise direction of the vane and form a groove to be slidably connected to the main body connector, and an edge of the groove may apply a force to the rubber grommet to cause the deformation.

In another embodiment, wherein the main body connector may include two connector portions spaced apart from each other at an interval with a predetermined distance and the peripheral wall may be located above the interval and above the second protrusion, and the rubber grommet may be pressed by the edge of the second protrusion.

In another embodiment, the air register assembly may further comprise a rear vane at an angle with the vane and a rear vane adjusting device to adjust a position of the rear vane, and the knob may be further connected to a rear vane adjusting device.

According to another aspect of the disclosure, an air register knob assembly is provided. The air register knob assembly may comprise: a vane having an outer edge, an inner edge opposite the outer edge, a first side between the outer edge and the inner edge, and a second side opposite the first side; and a knob connected to the vane to entirely expose the outer edge, wherein the knob may be slidably connected to the first side.

In one embodiment, the knob may include a connector, and the vane may include a mating member slidably connected to the connector, and wherein the connector may be disposed only on one side of the knob and the mating member may be provided only on the first side of the vane.

In another embodiment, wherein the knob may include an operation portion extending beyond the outer edge of the vane, and the operation portion may be spaced from the outer edge of the vane.

In another embodiment, the vane may further comprise a decorative member provided along the outer edge.

According to another aspect of the present disclosure, an air register knob assembly is provided. The air register knob assembly may comprise: a front vane, wherein the front vane may include an outer edge along a lengthwise direction, an inner edge opposite the outer edge, a first side between the outer edge and the inner edge, a second side opposite to the first side, and a first decorative member disposed along the outer edge; and a knob, wherein the knob may be slidably connected to only the first side of the vane, wherein, the first decorative member may be substantially aligned with a second decorative member on an instrument panel.

In one embodiment, the first and second decorative members may be chrome plated members.

In another embodiment, wherein movement of the knob may cause the vane to rotate around an axis passing through the outer edge portion of the vane.

According to the embodiments of the present application, the knob may be installed on a less visible side of the vane and an outer edge of the vane may be substantially stable relative to the Instrument panel such that a decorative part on the outer edge may be exposed entirely and be consistent with the surrounding highlighting decorative parts or features to provide continuous decoration and create inviting look or feel.

It is appreciated that the Summary provided above is to briefly introduce a few concepts that are further described in the Detailed Description. It is not meant to identify key or essential features of the claimed subject matter, the scope of which is defined uniquely by the Claims that follow the detailed description. Furthermore, the claimed subject matter is not limited to any particular examples described herein.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF ONE OR MORE EMBODIMENTS

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. As referenced in the figures, the same or similar reference numerals are used to refer to the same r similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to variously employ the present disclosure.

Vehicles are typically equipped with air register device and a knob for adjusting the angle of the vane in the air register. A common design of the knob is to fit the knob over the vane to realize slidable connection and adjustment. The inventors of the present disclosure have recognized that there is a need to provide an air register device having a better overall appearance while keeping desired strength.

Figure 1:
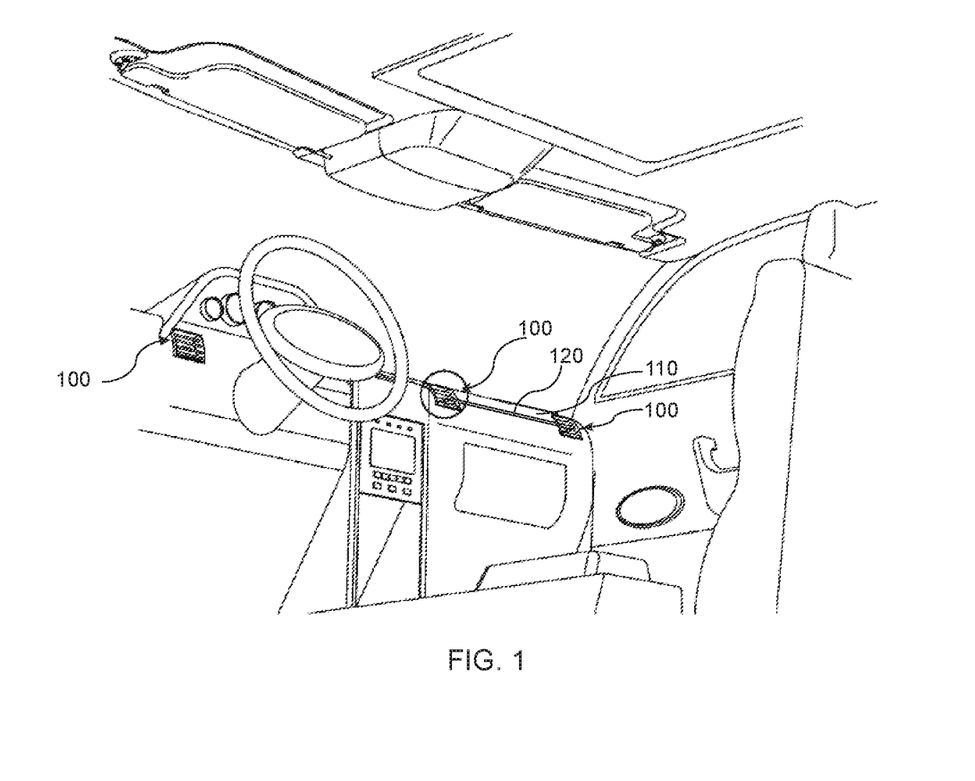
FIG. 1 schematically depicts part of a vehicle interior in which one or more embodiments of the present disclosure may be implemented.

FIG. 1 schematically described a partial vehicle interior in which air register devices of the present disclosure may be implemented. As shown in FIG. 1, one or more air register devices 100 may be provided in a vehicle. The air register devices 100 may be located on a vehicle's instrument panel 110. It should be appreciated that the air register devices 100 may be located on any other suitable locations, for instance, at a rear portion of a center console to provide comfort for rear passengers. In the embodiment shown in FIG. 1, the vehicle instrument panel 110 may further include a decorative member 120 extending at a transverse direction (i.e., a width direction of the vehicle), which may be a unique decorative chrome member. To enhance an overall look of the vehicle interior, the air register device 100 may include a decorative member aligned with the decorative member 120. For example, an edge of the vane may include a decorative member as described in detail below.

Figure 2A:
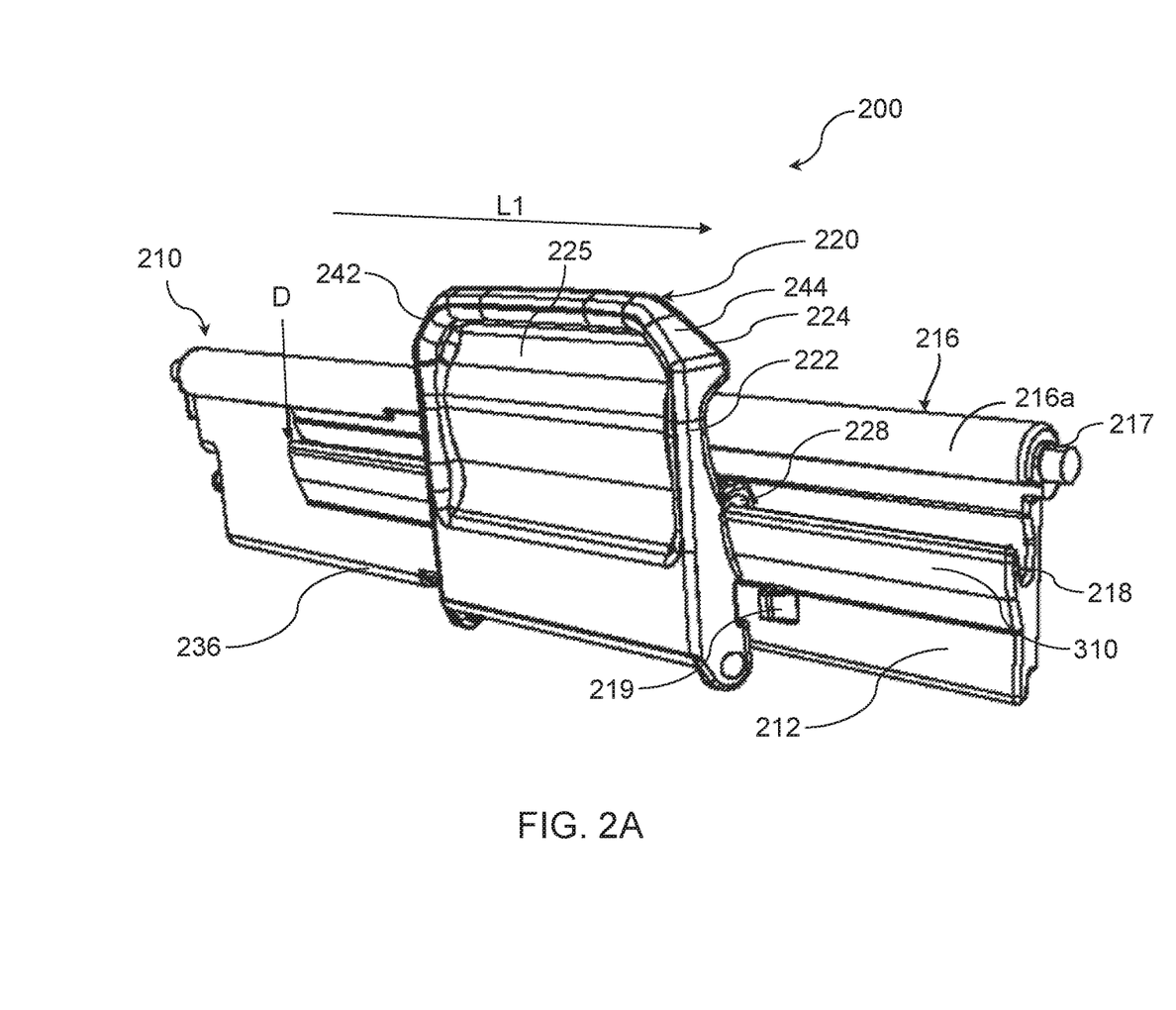
FIG. 2A schematically depicts a perspective view of an air register knob assembly viewed from a first side according to one embodiment of the present disclosure.
Figure 2B:
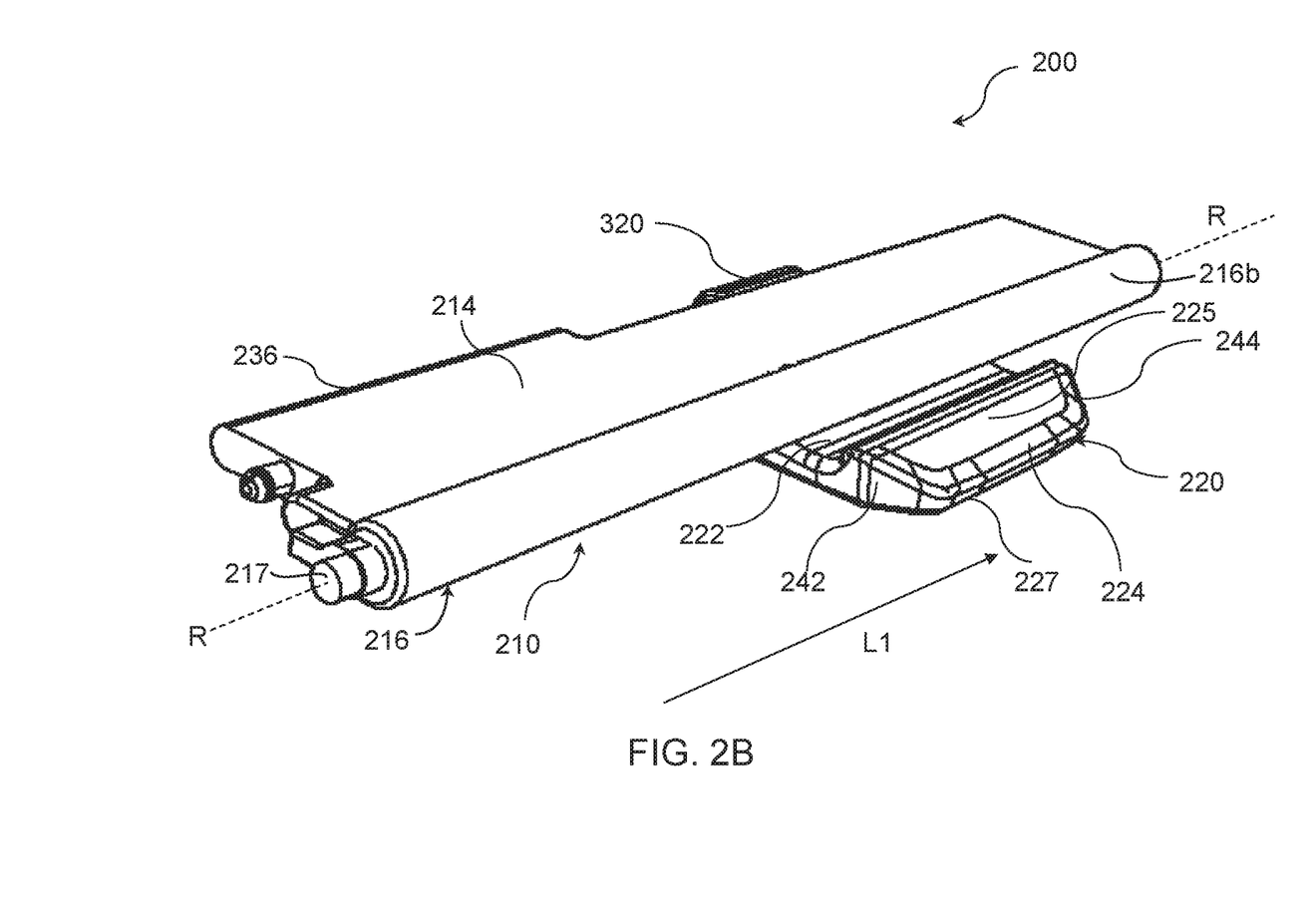
FIG. 2B schematically depicts a perspective view of the air register knob assembly in FIG. 2A viewed from a second side.

FIG. 2A shows a perspective view from a first side of an air register knob assembly 200 according to one embodiment of the present disclosure. FIG. 2B shows a perspective view of the knob assembly 200 from a second side, illustrating the knob assembly at a position assembled in the vehicle. In some embodiments, the air register knob assembly 200 may include an air register vane 210 and a knob 220 slidably connected to the vane 210. The vane 210 may include a first side 212 and a second side 214 opposite to the first side 212. The first side 212 and the second side 214 extend along a lengthwise direction L1 of the vane 210. The second 214 may be a more visible side on most occasions at an assembled use position. The knob 220 is shown to include a main body 222, and the main body 222 may be slidably connected to the first side 212 of the vane 210. In another non-limiting example, the vane 210 may include an outer edge 216. The outer edge 216 extends along the lengthwise direction L1 and the outer edge 216 may generally face toward the user at an assembled use position. The outer edge 216 has a first side circumferential portion 216a adjacent to the first side 212 as shown in FIG. 2A, and a second side circumferential portion 216b adjacent to the second side 214 and visible along an entire length as shown in FIG. 2B. In the non-limiting example shown in FIG. 2B, by connecting the knob 220 to one side (e.g. the first side 212) of the vane 210, the other side 214 may be exposed with an uninterrupted surface when the vane 210 is adjusted. The second side circumferential portion 216b of the outer edge 216 is uninterrupted as well and is visible along the entire length L1 of the vane 210 when the vane 210 and the knob 220 are assembled as illustrated in FIG. 2B.

Again refer to FIG. 1 to FIG. 2B, the vane 210 may include an outer edge 216 facing outward, and the outer edge 216 may be exposed entirely. In another non-limiting example, the vane 210 may include a decorative member, for example a chrome member. In one or more examples, the outer edge 216 may include an integrally formed decorative member (e.g., a decorative surface via spraying or formed via other processes) or include an attached decorative member (not shown). In another non-limiting example, the decorative member on the outer edge 216 may substantially cover the entire outer edge 216. In another non-limiting example, the decorative member on the outer edge 216 may be substantially aligned with the decorative member 120 on the instrument panel 110 such that the decorative member on the outer edge 216 and the decorative member 120 appear to be an integral member to provide a continuous stylish look. In one or more non-limiting examples, the knob 220 may slide along a lengthwise direction L1 of the vane 210 and may be pivoted by a user to cause the vane 210 to rotate as well such that the angle of the vane 210 and other parallel vanes (if any) may be adjusted. In one or more non-limiting examples, as shown in FIG. 2A and FIG. 2B, a pivot shaft 217 of the vane 210 may be generally located at the outer edge 216 of the vane 210. In the non-limiting example shown in FIG. 2B, the pivot shaft 217 may extend along the lengthwise direction L1 through the outer edge 216. As shown in FIGS. 2A and 2B, the outer edge 216 has a substantially round cross section, and the outer edge 216 may share a same central axis R with the shaft 217. That is, the movement of the knob 220 may cause the vane 210 to pivot about the shaft 217 and the decorative member on the outer edge 216 may not move substantially during rotation of the vane 210. In this way, the decorative member on the outer edge 216 and the decorative member 120 on the instrument panel 110 as shown in FIG. 1 may not move relative to each other and be misaligned during rotation of vane 210, and thus a continuous appearance of the decoration is provided. It should be appreciated that the vane 210 may rotate about the central axis R adjacent the outer edge 216. For example, the vane may have protrusions at two ends of the outer edge and the protrusions may be received in recesses formed on the frame of the air register device such that the vane may be pivotable about the axis adjacent the outer edge. In another example, the outer edge of the vane may have two recesses at two ends and may receive the protrusions on the air register frame such that the vane may be pivotable about the axis adjacent the outer edge.

In one or more non-limiting examples, refer to FIG. 2A and FIG. 2B, the air register knob assembly 200 may include the vane 210 and the knob 220 as described above, and the vane 210 may include an outer edge 216 and an inner edge 236 opposite the outer edge 216. The vane 210 may include a first side 212 between the outer edge 216 and the inner edge 236 and a second side 214 opposing the first side 212. The knob 220 may be slidably connected to the first side 212 of the vane 220 such that the entire outer edge 216 may be exposed.

In one or more non-limiting examples, the term "edge" may refer to an end portion of a part or a portion extending from the end portion to the main body of the part. For example, the edge may include a portion extending from the end portion to no more than ½ of main body. In another example, the edge may include a portion extending from the end portion to no more than ⅓ of main body. In yet another example, the edge may include a portion extending from the end portion to no more than ¼ of main body.

Term "outwardly" and "outer edge" as referenced herein or elsewhere may refer to a state that the device is at a position or toward a direction that is relatively closer to the user or more visible to the user after being installed on the vehicle or other devices. For instance, the outer edge 216 is closer to the user relative to other parts of the vane 210 and is visible to the user. The outer edge 216 is exposed entirely and is not blocked or interrupted by other parts or other devices. Unlike the traditional design where a knob encloses the vane 210, the entire outer edge 216 of the vane 210 is exposed along the length of the vane 210 and is not blocked from view during knob sliding or rotation movement, thus providing a better appearance and more pleasant feel.

Figure 3:
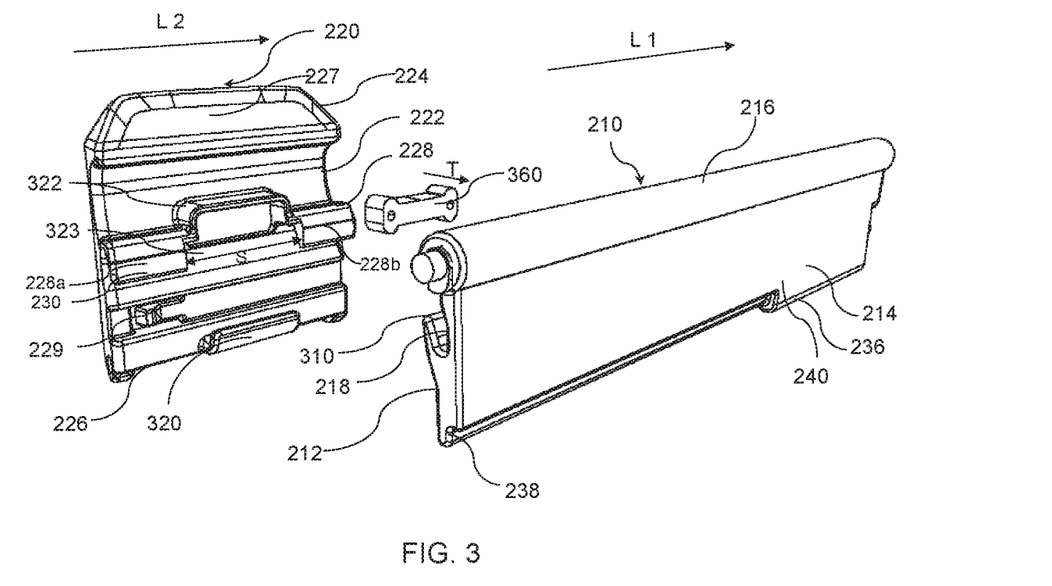
FIG. 3 shows an exploded view of the air register assembly in FIG. 2A-2B.

Further, in another embodiment of the present disclosure, as shown in FIG. 2A and FIG. 2B, the knob 220 may further include an operation portion 224 extending from a main body 222 beyond the outer edge 216 of the vane 210. The operation portion 224 and the main body 222 of the knob 220 are both spaced from the outer edge 216 (refer to FIG. 2B). In the above example, the operation portion 224 of the knob 220 extends from the main body 222 and passes the outer edge 216 such that it will not contact or block the outer edge 216. In another embodiment, the operation portion 224 is configured at a position that is closer to a user than the outer edge 216. In other words, the operation portion 224 may be a portion that is easy to be accessed by the user at the assembled state. For instance, the operation portion 224 of the knob might be closer to the user than the main body 222 of the knob. The operation portion 224 may have any suitable shape and size. In some embodiments, the design of the operation portion 224 may take into considerations of ergonomics. For instance, in a non-limiting example as shown in FIG. 2A to FIG. 3, the operation portion 224 may include a first operation surface 225 and an opposing second operation surface 227 with curved feature for the ease of user operation. The Knob 220 may further include the two end portions 242 and 244 which may have a ramp or an arc/curved surface for a user to slide the knob 220 relative to the vane 210 easily. In one or more non-limiting examples, there is no special border between the operation portion 224 and the main body 222. The operation portion 224 may be defined as a portion that is closer or easier to be accessed and/or easier to operate by a user compared to the main body. The operation portion 224 may be configured to be easy to operate and spaced apart from the outer edge 216 of the vane 210 so that the outer edge 216 may not be scratched by the operation portion 224 or the main body 222. Thus, wearing and undesired appearance of the knob 220 and vane 210 may be avoided. In one example, when the outer edge 216 is covered with a chrome part or a layer, wearing of the chrome part or the layer may be avoided and knob 220 may not block the view of the chrome part or the layer during any working positions.

FIG. 3 schematically depicted an explosive view of the vehicle air register knob assembly 200 according to one embodiment of the present disclosure. With further reference to FIG. 1 through FIG. 2B, in another non-limiting example, the main body 222 of the knob 220 may include a connector 228, and the first side 212 of the vane 210 may include a mating member 218 corresponding to the connector 228. In one example, the connector 228 is formed as a first protrusion 310 extending from a surface of the main body 222 of the knob 220 toward the vane 210. In the example depicted in figures, the connector 228 may include a first protrusion 230 extending from the main body 222 at an angle to the surface of the main body 222. In one or more examples, the angle between the first protrusion 230 and the main body 222 is smaller than 90 degrees while the mating member 218 may be a groove 218 formed on the first side 212 of the vane 210 to receive the the first protrusion 230 and enable sliding movement of the connector 228 in the groove. In one example, the groove 218 may be defined by a portion of the surface of the first side and a second protrusion 310 protruding from the first side 212 of the vane 210. In the depicted embodiment, the second protrusion 310 generally faces toward the outer edge 216 of the vane 210. The first protrusion 230 and the surface of the main body 222 may form a recess generally facing toward the inner edge 236 of the vane 210. In this configuration, the first protrusion 230 and the second protrusion 310 may be engaged. In one or more examples, the second protrusion 310 and the first side 212 form an angle less than 90 degrees. In some embodiments, the second protrusion 310 extends generally along the lengthwise direction L1 of the vane 210. A length of the second protrusion 310 along the direction L1 may be designed as necessary, for example according to a distance of the knob 220 to travel on the vane 210. In another example, a stop 229 may be provided on the main body 222 of the knob 220, while the vane 210 may accordingly have a mating stop 219 (refer to FIG. 4). It should be appreciated that, the stops 219 and 229 may not be necessary. The groove 218 or the connector 228 may provide end portions and suitable length to achieve the effect of limiting the movement of the knob 220. In one or more non-limiting examples, the groove 218 as well as the second protrusion 310 of the vane 210 as shown in FIG. 2A to FIG. 2B may have a length less than the vane 210 along the direction L1, thereby when the knob 220 slides to the end D of the groove 218, it may be naturally restricted and may not travel further to the left hence similarly being stopped.

Again referring to FIG. 1 through FIG. 3, in one or more embodiments, the knob 220 may further include an accessory connector 320, and the accessory connector 320 may be slidably connected to the vane 210. In one or more examples, the accessory connector 320 may be disposed at an edge 226 opposing the operation portion 224 of the knob 220. The vane 210 may have an outer edge 216 and an inner edge 236 opposite to the outer edge 216. And the accessory connector 210 may be slidably connected to at least a portion of the inner edge 236. In one or more examples, the accessory connector 320 may extend away from the surface of the knob 220 toward the outer edge 216 of the vane 210 or the operation portion 224 of the knob 220, and the accessory connector 320 may extend along a lengthwise direction L2 of the knob 220. In an installed or assembled position, the lengthwise direction L2 of the knob 220 may be the same as the lengthwise direction L1 of the vane 210. In some other examples, the inner edge 236 of the vane 210 may include a thinned area 238 and a standard area 240, and the accessory connector 320 may at least surround the thinned area 238. The accessory connector 320 may further strengthen the connection between the knob 220 and the vane 210. By connecting to the inner edge 236 of the vane 210, the accessory connector 320 may minimize the impact to the overall outlook of the vane 210. The thinned area 238 may render a smaller total thickness of the accessory connector 320 and the inner edge 236 of the vane 210, which may eliminate the negative impact to air flow especially when the vane 210 is at a largest possible air flow position and may further have a better appearance.

Figure 4:
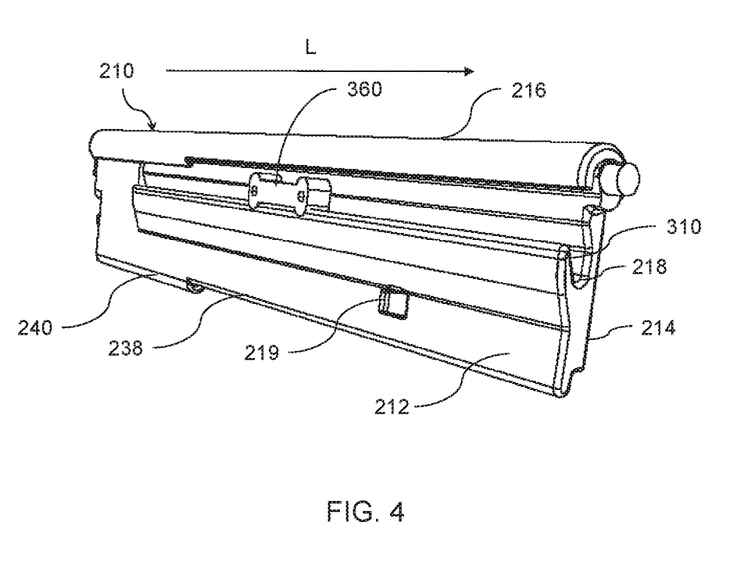
FIG. 4 schematically depicts a relative position of a rubber grommet and a vane of the vehicle air register knob assembly according to one embodiment of the present disclosure.

FIG. 4 schematically depicted a relative position of a grommet 360 to the vane 210 of the vehicle air register knob assembly according to one embodiment of the present disclosure. In one or more non-limiting examples, the knob 220 and the vane 210 may include a flexible friction portion. The friction portion may maintain the knob at a certain position with a suitable friction force and may avoid a position change due to vibration or the like. In one or more examples, the flexible friction portion may be formed on one or both of the knob 220 and vane 210 via injection molding or any other suitable method.

Again referring to FIG. 2 through FIG. 4, in some embodiments, the flexible friction portion may be a grommet 360 received in a peripheral wall 322 formed on the knob 220. The grommet 360 may be pressed by the vane 210 to generate a predetermined friction force. In one or more examples, the grommet 360 may be a rubber grommet. In some other examples, the knob 220 may include a connector 228 formed on one side of the knob and the vane 210 may include a second protrusion 310 extending from a first side 212 of the vane 210. The second protrusion 310 may generally extend along the lengthwise direction L1 of the vane 210 and form a groove 218. The groove 218 may be slidably connected to the connector 228. The edge of the groove 218 that is also the free end/side of the second protrusion 310 may press the grommet 360 to deform and generate suitable friction force.

Again referring to FIG. 3 and FIG. 4, in one example, the connector 228 may include a first connector 228a and a second connector 228b spaced from each other at an interval 323 having a distance S, and the peripheral wall 322 may be located above the interval 323. That is, the peripheral wall 322 may be positioned above the second protrusion 310 of the vane 210/In other words, the peripheral wall 322 may be closer to the outer edge 216 than the second protrusion 310. The rubber grommet 360 may be squeezed/pressed by the edge of the groove 218 of the vane 210 (i.e., the edge of the second protrusion 310). It should be appreciated that in some other examples, the peripheral wall may be located under the interval 323 with the distance S. By changing the extending direction of the second protrusion (e.g., the extending direction of the second protrusion 530 illustrated in FIG. 6), the friction may be generated between the edge of the second protrusion and the grommet. In a non-limiting example, as shown in FIG. 3 and FIG. 4, the grommet 360 may extend along the lengthwise direction L1 of the vane 210 and may include two large ends with a greater width, and the two large ends may generate friction with the edge of the groove 218. In a non-limiting example, the grommet 360 may have a suitable thickness along a thickness direction T as shown in FIG. 3 such that the grommet 360 may contact the edge of the groove 218 of the vane while the knob 220 is slidably moving relative to the vane 210. In some embodiments, the first side 212 of the vane 210 may provide a similar peripheral wall or other structure to receive the grommet 360, and the grommet 360 may move relative to the knob 220. In some embodiments, a peripheral wall 322 is not needed. The grommet may be fixed to the knob or the vane by adhesive material or other structures, such as a protrusion through the grommet along the thickness direction T.

Figure 5:
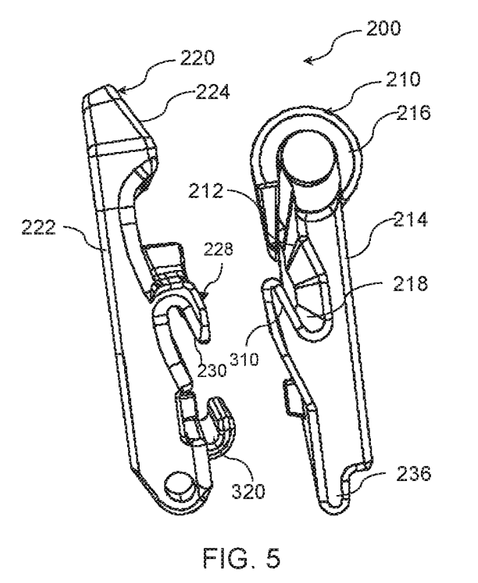
FIG. 5 schematically depicts a side view of a vane and a knob connector of the air register knob assembly according to one embodiment of the present disclosure.

FIG. 5 depicts a side view of the air register knob assembly 200 shown in FIG. 3 and FIG. 4. As shown in FIG. 5, the knob 220 may include the connector 228 (i.e., a first protrusion 230) and the accessory connector 320 generally located on one side, and the connector 228 and the accessory connector 320 may be respectively slidably connected to the second protrusion 310 and the lower edge 236 of the vane 210 such that the knob 220 may generally be connected to the first side 212 of the vane 210. In this example, the first protrusion 230 and the knob 220 may form a recess facing toward the accessory connector 320 while the second protrusion 310 of the vane 210 may extend toward the outer edge 216. That is, the first protrusion 230 of the knob 220 may be received in the groove 218 formed by the second protrusion 310 and the first side of the vane 210 so that the knob 220 may be slidably connected to the vane 210.

Figure 6:
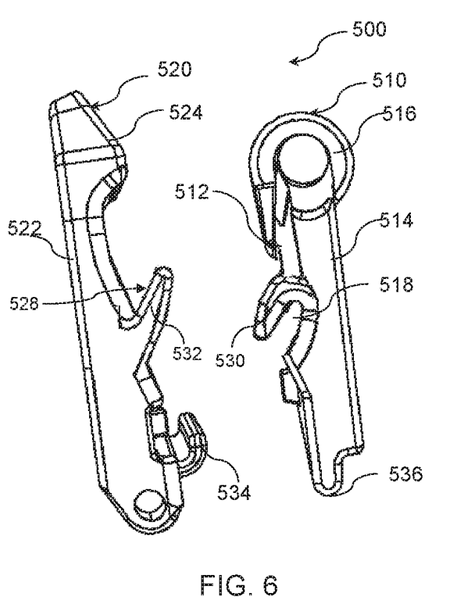
FIG. 6 schematically depicts a side view of a vane and a knob connector of the air register knob assembly according to another embodiment of the present disclosure.

It should be appreciated that the configurations of the mating member 218 of the vane 210 and the connector 228 of the knob 220 may be varied. For instance, FIG. 6 illustrates a side view of an air register knob assembly 500 according to another embodiment of the present disclosure. The knob assembly 500 may include a vane 510 and a knob 520. The knob 520 may include a main body 522 and an operation portion 524, and the main body 522 may include a connector 528 and an accessory connector 534. The connector 528 may include a first protrusion 532 at an angle with a surface of the main body 522 and meanwhile extending toward the operation portion 524. The vane 510 may include a first side 512 adjacent the knob 520 and an opposing second side 514. The first side 512 may include a second protrusion 530 engaging the connector 528. The second protrusion 530 and the first side 512 of the vane 510 may define a groove 518 facing toward the inner edge 536. The first protrusion 532 may be received in the groove 518 such that the vane 510 may be slidably connected to the knob 520. Further, the accessory connector 534 may be slidably connected to the inner edge 536 of the vane 510 to improve robustness. In the example shown in FIGS. 5 and 6, the main connector 528 and the accessory connector 534 may extend toward the same direction for instance the operation portion 524, and similarly the knob 520 may be slidably connected to the vane 510.

Figure 7:
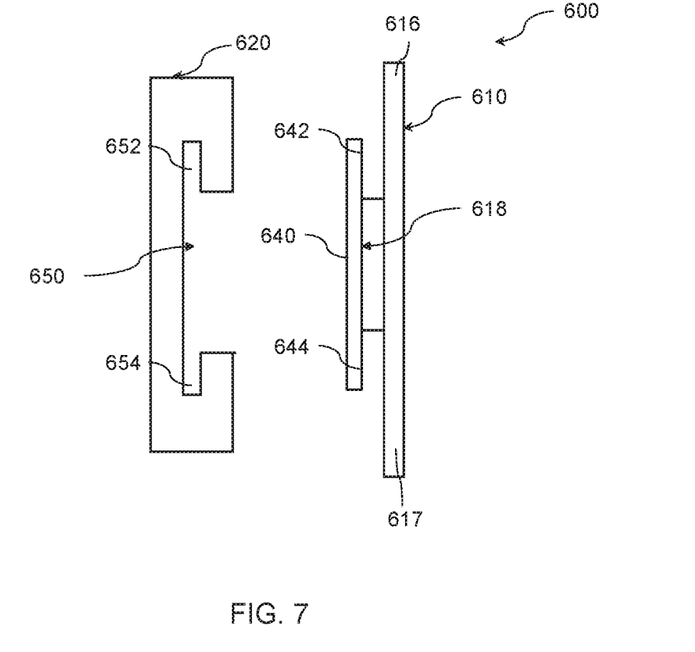
FIG. 7 schematically depicts a side view of a vane and a knob connector of the air register knob assembly according to another embodiment of the present disclosure.

FIG. 7 depicts a side view of an air register knob assembly 600 according to another embodiment of the present disclosure. In the embodiment shown in FIG. 7, the air register knob assembly 600 may include a vane 610 including a main body connector 618 and a knob including a groove 650. The main body connector 618 may include a body 640 and an upper slider 642 and a lower slider 644, extending from the body 640 toward the outer edge 616 and the inner edge 617, respectively. The groove 650 on the knob 620 may include an upper groove 652 and a lower groove 654 to receive the upper slider 642 and the lower slider 644, respectively. It should be appreciated that other variations or modifications of the connecting mechanism between the vane and knob are possible. For instance, the vane 610 may include a groove and correspondingly the knob 620 may provide a slider on a corresponding side.

Although it is not specifically discussed in the above embodiments, it should be appreciated that the air register assembly 100 may include a rear vane at an angle with the vane 210 and associated rear vane adjusting device. The knob 220 according to one or more embodiments of the present disclosure may include a fork portion integrally formed to adjust the rear vane, and the details will be omitted here for brevity. In some embodiments, the knob 220 may be connected to a rear vane adjusting device, for instance the adjusting device described in a pending application CN201610096486.2. The knob 220 in one or more embodiments may be slidable relative to the front vane 210 and also may be rotatable along with the front vane 210 so as to adjust the rear vane. In this embodiment, convenience as well as robustness may be ensured, while the exposed outer edge of the vane and the decorative feature provides a better appearance. In some examples, the vehicle interior may include decorative features on the instrument panel and the aligned decorative feature on the edge of air register vane. During adjustment of the air register, the decorative features on the instrument panel and the vane may keep aligned and provide a better look and feel.

As described in the specification, one or more embodiments of the present disclosure provide a knob assembly with improved structure and appearance. Although the present application is discussed under the context of vehicles, it should be appreciated that it may be applied in other suitable areas, for instance airplanes, ships, house appliances and so on. Those who skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An air register knob assembly, comprising:
    a vane having a first side, a second side opposite the first side and an outer edge, wherein the first side, the second side and the outer edge extend along a lengthwise direction of the vane;
    a knob having a main body, wherein the main body is slidably connected to the first side of the vane;
    wherein a second side circumferential portion of the outer edge is not covered by the knob and is visible along an entire length of the vane when the vane and the knob are assembled;
    wherein the knob includes an operation portion extending from the main body, when the vane and the knob are assembled, the operation portion extends beyond the outer edge of the vane, and the operation portion is spaced apart from the outer edge.

2. The air register knob assembly of claim 1, wherein the main body of the knob includes a connector and the first side of the vane includes a mating member slidably connected to the connector.

3. The air register knob assembly of claim 2, wherein the connector includes a first protrusion extending from a surface of the main body towards the vane, and the mating member includes a groove that engages the first protrusion, and wherein the first protrusion and the groove extend along the lengthwise direction of the vane.

4. The air register knob assembly of claim 3, wherein at least one of the knob and the vane includes a stop.

5. The air register knob assembly of claim 3, wherein the first protrusion extends from the surface of the main body towards the vane at an angle, and the vane includes a second protrusion that extends from the first side of the vane, the groove is defined between the second protrusion and the first side of the vane, wherein the second protrusion extends towards the outer edge of the vane or an inner edge of the vane opposite the outer edge.

6. The air register knob assembly of claim 3, wherein the connector includes a base, an upper slider and a lower slider, wherein the upper slider and the lower slider extends towards the outer edge of the vane and an inner edge opposite the outer edge of the vane, respectively, and wherein the groove includes an upper groove and a lower groove to receive the upper slider and the lower slider, respectively.

7. The aft register knob assembly of claim 1, wherein the knob includes an accessory connector and the accessory connector is slidably connected to the vane.

8. The air register knob assembly of claim 7, wherein the accessory connector is disposed on an edge of the knob opposite to the operation portion and the accessory connector is slidably connected to at least a portion of an inner edge of the vane, and wherein the inner edge of the vane has a thinner region and a standard region and the accessory connector is at least partially surrounding the thinner region.

9. The air register knob assembly of claim 1, wherein the knob includes a flexible rubbing portion.

10. The air register knob assembly of claim 9, wherein the flexible rubbing portion is a rubber grommet received in a peripheral wall on the knob and wherein deformation of the rubber grommet due to a force from at least a portion of the vane generates a predetermined friction force.

11. The air register knob assembly of claim 10, wherein the knob has a first protrusion disposed on a surface of the knob, and the vane has a second protrusion extending from the first side of the vane, wherein the second protrusion extends along the lengthwise direction of the vane and forms a groove to be slidably connected to the first protrusion, and an edge of the groove applies a force to the rubber grommet to cause the deformation.

12. The air register knob assembly of claim 11, wherein the first protrusion includes two connector portions spaced apart from each other at an interval with a predetermined distance and the peripheral wall is located above the interval and above the second protrusion, and the rubber grommet is pressed by an edge of the second protrusion.

13. The air register knob assembly of claim 1, wherein the knob includes a first protrusion and the vane includes a mating member slidably connected to the first protrusion, and wherein the first protrusion is disposed only on one side of the knob and the mating member is provided only on the first side of the vane.

14. The air register knob assembly of claim 1, further comprising a decorative member provided along the outer edge.

15. The air register knob assembly of claim 1, further comprising a first decorative member disposed along the outer edge; and wherein the first decorative member is substantially aligned with a second decorative member on an instrument panel.

16. The air register knob assembly of claim 15, wherein the first and second decorative members are chrome plated members.

17. The air register knob assembly of claim 15, wherein movement of the knob causes the vane to rotate around an axis passing through the outer edge of the vane.

* * * * *